United States Patent
Barr

(10) Patent No.: US 10,421,677 B2
(45) Date of Patent: *Sep. 24, 2019

(54) SYSTEMS AND METHODS FOR WATERCRAFT HAVING INVASIVE SPECIES MITIGATION CAPABILITY

(71) Applicant: Dale C. Barr, Bremerton, WA (US)

(72) Inventor: Dale C. Barr, Bremerton, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/556,644

(22) Filed: Dec. 1, 2014

(65) Prior Publication Data

US 2015/0210570 A1  Jul. 30, 2015

Related U.S. Application Data

(63) Continuation of application No. 12/015,857, filed on Jan. 17, 2008, now Pat. No. 9,180,939.

(51) Int. Cl.
*B63B 27/24* (2006.01)
*C02F 1/467* (2006.01)
*C02F 1/72* (2006.01)
*C02F 1/74* (2006.01)
*C02F 1/78* (2006.01)
*C02F 7/00* (2006.01)
*C02F 1/00* (2006.01)
*C02F 1/68* (2006.01)
*C02F 103/00* (2006.01)
*C02F 103/08* (2006.01)

(52) U.S. Cl.
CPC ............ *C02F 1/78* (2013.01); *C02F 1/008* (2013.01); *C02F 1/685* (2013.01); *C02F 1/727* (2013.01); *C02F 7/00* (2013.01); *B63B 27/24* (2013.01); *C02F 1/4672* (2013.01); *C02F 1/74* (2013.01); *C02F 2103/007* (2013.01); *C02F 2103/08* (2013.01); *C02F 2305/023* (2013.01)

(58) Field of Classification Search
CPC ........ B63B 27/24; C02F 1/4672; C02F 1/685; C02F 1/727; C02F 1/74; C02F 1/78; C02F 2103/007; C02F 2103/08; C02F 2305/023; C02F 7/00; C02F 1/008
See application file for complete search history.

(56) References Cited

U.S. PATENT DOCUMENTS

| | | | | |
|---|---|---|---|---|
| 3,434,447 A | * | 3/1969 | Christensen | B63H 1/28 114/67 R |
| 3,823,684 A | * | 7/1974 | Baggs | B63H 5/16 114/145 R |
| 5,089,120 A | * | 2/1992 | Eberhardt | C02F 1/685 114/124 |
| 5,744,072 A | * | 4/1998 | Karliner | B01F 3/04765 114/352 |
| 6,093,422 A | * | 7/2000 | Denkewicz, Jr. | C02F 1/505 424/618 |
| 6,551,519 B1 | * | 4/2003 | Hartwig | C02F 1/78 210/760 |
| 2006/0011555 A1 | * | 1/2006 | Aulniers | C02F 7/00 210/747.6 |
| 2006/0027507 A1 | * | 2/2006 | van Leeuwen | C02F 1/78 210/760 |
| 2008/0210639 A1 | * | 9/2008 | Leistner | C02F 1/685 210/747.6 |

* cited by examiner

*Primary Examiner* — Lucas A Stelling

(57) ABSTRACT

Systems and methods for watercraft and marine propulsions systems having marine environment enhancement capabilities are disclosed.

20 Claims, 12 Drawing Sheets

SYSTEMS AND METHODS FOR WATERCRAFT HAVING INVASIVE SPECIES MITIGATION CAPABILITY

CROSS-REFERENCE TO RELATED APPLICATIONS

This patent application claims priority from, and is a continuation of, U.S. patent application Ser. No. 12/015,857 filed Jan. 17, 2008, which application is incorporated herein by reference.

FIELD OF THE DISCLOSURE

The present disclosure relates generally to systems and methods for watercraft that have a capability to enhance a marine environment, and more specifically, to watercraft systems and methods having a capability to dispense substances that attempt to enhance the marine environment in which they are operate.

BACKGROUND

Human activities are generally intended to maintain or improve the quality of life for humans, often to the detriment of other forms of life. Marine environments have historically borne the brunt of harmful human activities due to an unfortunate out-of-sight, out-of-mind approach to waste disposal, over-harvesting, and other harmful activities.

For example, it is known that fertilizers, herbicides, and pesticides commonly used for agricultural production may have highly detrimental impacts on the ability of marine environments to sustain life. Similarly, residential development along shores may result in undesirable discharges into marine environments from landfills, septic systems, and other ordinary residential activities (e.g. gasoline, oil, pesticides, fertilizers, detergents, human pathogens, medicinal compounds, etc.). Runoff from farmland and urban population centers may carry such substances, as well as other harmful chemical and particulate content, to adjoining marine environments. Such substances are even known to result in oxygen-depleted regions or "dead zones" within downstream marine environments that are unable to sustain many species of marine life. Other human activities, such as shipping and transportation activities, inevitably increase pollutant levels in marine environments due to ordinary discharges (e.g. oil, diesel fuel, and engine exhaust), as well as accidental discharges and spills. Even human recreational activities, such as boating, jet-skiing, boat racing, and cruise ships, may have deleterious effects on water quality, and the health of aquatic life within a marine environment.

Some contemporary societies have developed an improved appreciation for the importance of responsible water management. For example, some governmental authorities have enacted laws intended to limit the deleterious effects of human activities on water quality, while other organizations are taking action to protect, improve, and steward specific aquatic environments, such as the Tahoe Regional Planning Agency, the SeaDoc Society, the Puget Sound Partnership, the Flathead Lakers, the Great Lakes Regional Collaboration, the Gulf of Mexico Alliance, and many other similar organizations.

Despite the commendable efforts of these organizations and authorities, human activities continue to threaten the health of marine environments. The ability of marine environments to recover from detrimental human activities continues to diminish, and as human populations increase, aquatic life faces an ever-increasing struggle for survival.

BRIEF DESCRIPTION OF THE DRAWINGS

Embodiments of methods and systems in accordance with the teachings of the present disclosure are described in detail below with reference to the following drawings.

DETAILED DESCRIPTION

Figure 1:
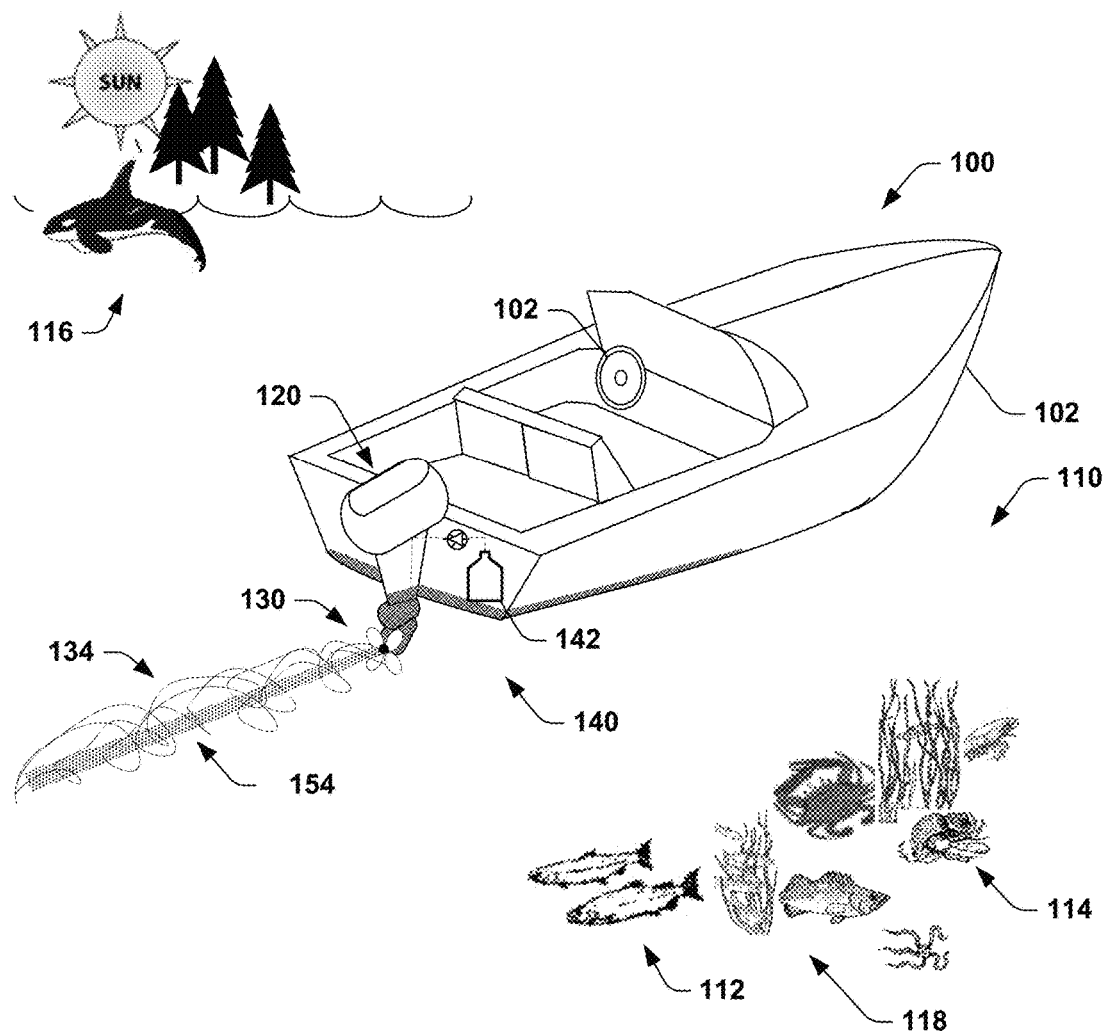
FIG. 1 is a schematic view of a watercraft having a marine environment enhancement system in accordance with an embodiment of the present disclosure.

Systems and methods for watercraft having marine environment enhancement capabilities are described herein. Many specific details of certain embodiments are set forth in the following description and in FIGS. 1-23 to provide a thorough understanding of such embodiments. One skilled in the art will understand, however, that the invention may have additional embodiments, or that alternate embodiments may be practiced without several of the details described in the following description.

Generally, embodiments of systems and methods in accordance with the present disclosure involve dispensing ecologically-appropriate, environment-enhancing substances into a marine environment during operation of a watercraft. The enhancement substances may be advantageously configured to enhance the marine environment in which such systems are operating. It is anticipated that, in at least some embodiments, the enhancement substances may be prescribed and regulated by governing authorities having responsibility for the care and management of water quality and aquatic species within a particular jurisdiction, region, or marine environment. Thus, embodiments of systems and methods in accordance with the present disclosure take active measures to attempt to improve the marine environment in which watercraft operate by dispensing ecologically-appropriate substances during watercraft operation.

Embodiments of systems and methods in accordance with the present disclosure may provide significant advantages. For example, by dispensing ecologically-appropriate substances using a watercraft during operation of the watercraft in the marine environment, such substances may be more effectively introduced into the marine environment in comparison with alternate methods. Specifically, the ecologically-appropriate substances may be introduced at the location where they are needed the most, i.e. where watercraft are actually operating. In addition, since the need for a particular ecologically-appropriate substance may depend on the amount of human activity in a particular marine environment (e.g. boating, jet-skiing, shipping, fishing, etc.), the application of ecologically-appropriate substances may automatically increase or decrease in accordance with the need for such substances. Thus, much like medications applied to a human body to treat illness or infection, the dosage of ecologically-appropriate substance dispensed into the marine environment may be increased or decreased as needed, and may be applied at locations where the need is greatest.

Another advantage is that the ecologically-appropriate substances are dispensed by those who are actually using the marine environment. This may have a desirable consequence of promoting awareness of the importance of responsible water management to those persons and entities having the greatest impact on the marine environment, and may lead to responsible actions by such persons in other ways. Since the burden (i.e. labor and expense) of dispensing the ecologically-appropriate substances is removed from the governing authorities responsible for management of the marine environment, such authorities may instead devote resources to other suitable activities, such as monitoring and testing activities, and research and development activities intended to provide improved ecologically-appropriate substances to further enhance water quality and the promote desirable aquatic species.

Particular embodiments of systems and methods for watercraft having marine environment enhancement capabilities will now be described to provide an improved understanding of various aspects of such embodiments. It will be appreciated, however, that the following detailed description of particular embodiments is merely exemplary, and is not exhaustive, of all of the various possible embodiments that are contemplated by the inventor as being within the scope of the teachings and claims of the present disclosure.

For example, FIG. 1 is a schematic view of a watercraft 100 having a marine environment enhancement system 140 in accordance with an embodiment of the present disclosure. The watercraft 100 operates in an exemplary marine environment 110 that is home to a variety of species, including fish 112, shellfish 114, marine mammals 116, marine vegetation 118, and numerous other aquatic species. As described more fully below, the marine environment enhancement system 140 is configured dispense one or more ecologically-appropriate substances intended to enhance the marine environment 110.

The watercraft 100 includes a hull 102 (or structure) that supports a marine propulsion system 120. In this embodiment, the marine propulsion system 140 is of a type generally referred to as an outboard engine. A control system 104 is coupled to the marine propulsion system 120 in a conventional manner to enable an operator (not shown) to controllably operate the watercraft 100.

Figure 2:
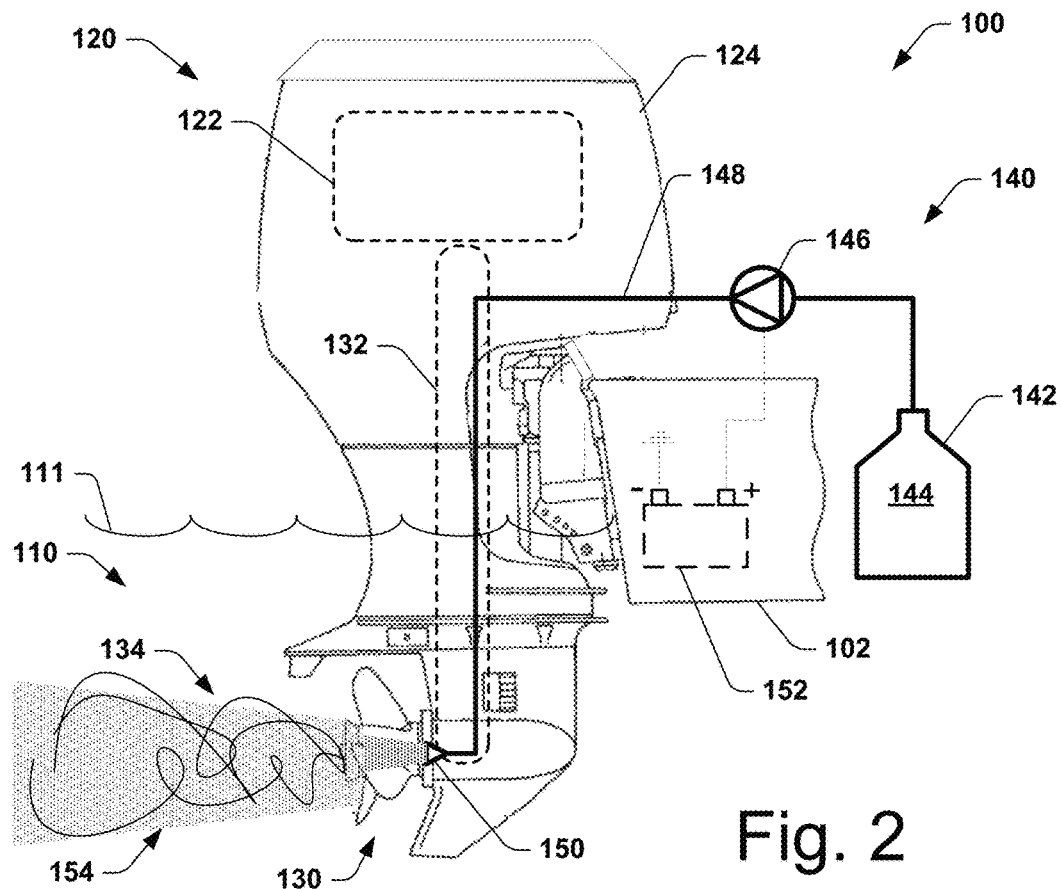
FIG. 2 is a partial side view of the watercraft of FIG. 1.
Figure 3:
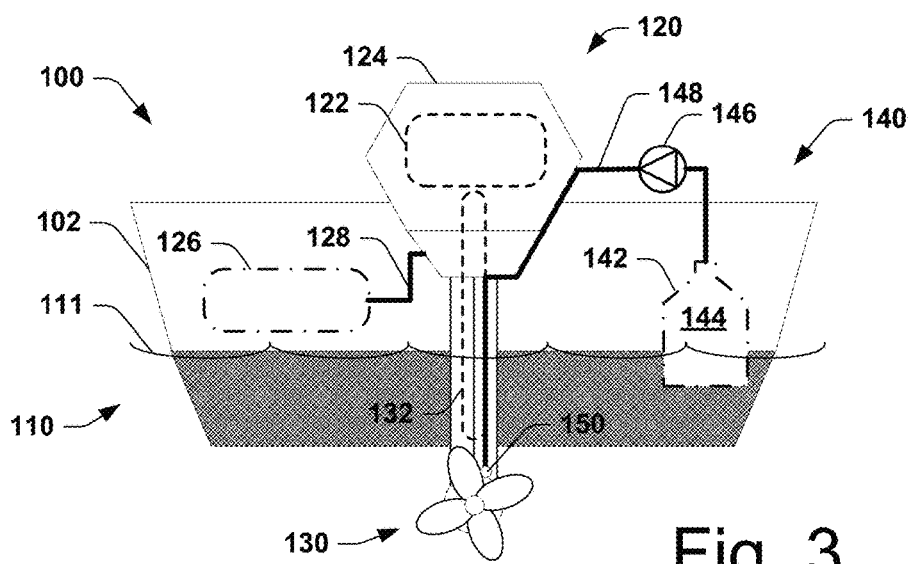
FIG. 3 is a rear elevational view of the watercraft of FIG. 1.

FIGS. 2 and 3 are partial side and end views, respectively, of the watercraft 100 of FIG. 1. The marine propulsion system 120 includes an engine 122 disposed within a housing 124, and a fuel supply 126 coupled to the engine 122 by a fuel line 128. A propeller assembly 130 is driven by a drive assembly 132 that is operatively coupled to the engine 122.

In this embodiment, the marine environment enhancement system 140 includes a supply vessel 142 that holds an enhancement substance 144. A pump 146 is coupled to a feed line 148 that extends from the supply vessel 142 to a dispensing portion 150. In some embodiments, the pump 146 may be an electric pump that may be driven, for example, by a battery 152 or other suitable source of electrical power. As best shown in FIG. 3, in this embodiment, the feed line 148 extends along an outer surface of the housing 124. The dispensing portion 150 is situated beneath a water surface 111 and, in this embodiment, proximate the propeller assembly 130.

Figure 4:
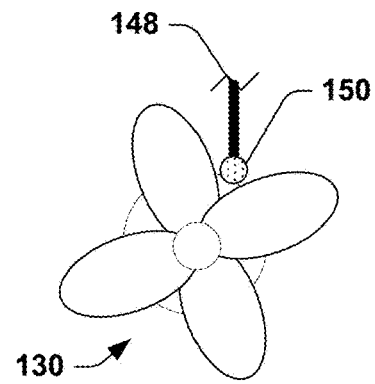
FIGS. 4-6 are partial end views of various alternate embodiments of propeller assemblies of marine propulsion systems in accordance with embodiments of the present disclosure.
Figure 5:
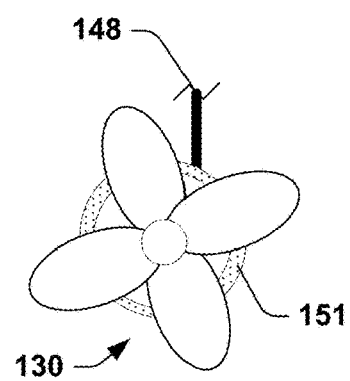
Figure 6:
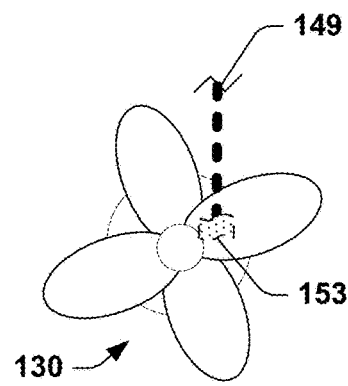

As best shown in FIG. 4, the dispensing portion 150 may be mounted to an exterior of the housing 124 of the marine propulsion system 120. The dispensing portion 150 may be configured in a wide variety of suitable embodiments, including a simple aperture, a nozzle, a "shower head" having a plurality of apertures, or any other suitable dispensing arrangement. In an alternate embodiment, as shown in FIG. 5, the enhancement system 140 may include an annular dispensing portion 151 that is annularly disposed about a lower portion of the marine propulsion system 120 to enhance distribution of the enhancement substance 144.

In another embodiment, a dispensing portion 153 and a feed line 149 of the enhancement system 140 may be disposed within the housing 124 of the marine propulsion system 120. In further embodiments, the enhancement substance 144 may be dispensed into an exhaust flow from the engine 122 prior to entering the marine environment 110. In such embodiments, the enhancement substance 144 may advantageously have sufficient time to mix and react with the constituents of the exhaust flow prior to entering the marine environment 110. Such improved mixing and reaction may substantially enhance the ability of the enhancement substance 144 to promote the health and quality of the marine environment 110 and the marine life residing therein. Of course, a wide variety of other dispensing embodiments may also be conceived.

In operation, the watercraft 100 is positioned within the marine environment 110. With the engine 122 running, the drive assembly 132 is engaged causing the propeller assembly 130 to rotate. The rotation of the propeller assembly 130 produces a drive stream 134 that propels the watercraft 100 forward through the marine environment 110. As the marine propulsion system 120 operates, however, the pump 146 of the marine environment enhancement system 140 transports the enhancement substance 144 from the supply vessel 142 through the feed line 148 and out the dispensing portion 150. A plume 154 of the enhancement substance 144 is dispensed from the dispensing portion 150. Due to the positioning of the dispensing portion 150, the plume 154 may become co-mingled with the drive stream 134 produced by the propeller assembly 130. In this way, the enhancement substance 144 may be dispensed within the marine environment 110 to ecologically enhance the marine environment 110.

The enhancement substance 144 may include a wide variety of substances, mixtures, compounds, and molecules depending upon the particular needs of the marine environment 110 in which the watercraft 100 is operated. For example, the enhancement substance 144 may be as simple as food or nutrients intended to promote the health and growth of one or more desirable species within the marine environment 110. Alternately, the enhancement substance 144 may be configured to deter or eradicate one or more undesirable species within the marine environment 110. For example, it may be desirable to eliminate certain invasive (or non-native) species from a particular marine environment 110, including invasive vegetation (e.g. Spartina grass, watermilfoil, algae, purple loosestrife), invasive shellfish and mollusks (e.g. zebra mussels, quagga mussel, rusty crayfish), invasive fishes and animals (e.g. invasive tunicates, sea lamprey, goby, ruffle), or any other suitable types of invasive species (e.g. crustaceans, etc.).

It may be desirable to deter or inhibit even certain native species from particular marine environments. For example, it may be desirable to deter the presence of certain species from certain areas, such as deterring predatory fish (e.g. sharks) or predatory marine mammals (e.g. sea lions) from preying on fish at spawning locations or at certain congregation points (e.g. locks, fish ladders) along a migratory path, or deterring certain shellfish predators (e.g. snails, starfish) from areas where shellfish are desired to flourish. Of course, enhancement substances may also be dispensed to control the growth of noxious native vegetations (e.g. milfoil, algae) or other undesirable species.

The enhancement substance 144 may also be configured to correct other types of deficiencies or undesirable attributes of the marine environment 110. For example, in some environments, lack of a particular substance, compound, or molecule (e.g. oxygen) poses a serious threat to marine species within the environment. The enhancement substance 144 may be configured to provide (or enhance the presence of) that particular substance, compound, or molecule to correct the deficiency. In other environments, an overabundance of a substance, compound, or molecule may inhibit the health of a marine environment, in which case the enhancement substance 144 may be configured to reduce (or inhibit the presence of) that substance, compound, or molecule. Enhancement substances may be configured, for example, to correct harmful industrial pollutants (e.g. heavy metals, oil sludge, toxins, carcinogens, PCBs, etc.) that may have been deposited within a marine environment, including such harmful substances deposited prior to contemporary environmental regulations preventing such activities.

It will be appreciated that a variety of alternate embodiments of marine enhancement systems and methods may be conceived, and that the present disclosure is not limited to the particular embodiments described above with reference to FIGS. 1-6. For example, FIGS. 7-10 are side views of marine propulsion systems having marine environment enhancement capabilities in accordance with various alternate embodiments of the present disclosure. For the sake of brevity, only some of the more significant differences in the structural or operational aspects of these alternate embodiments will be described in detail.

Figure 7:
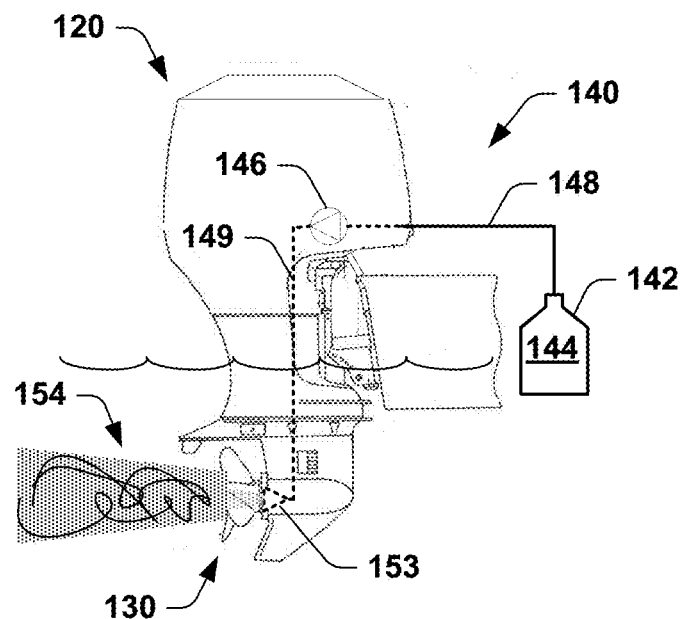
FIGS. 7-10 are side views of various alternate embodiments of marine propulsion systems having marine environment enhancement capabilities in accordance with embodiments of the present disclosure.
Figure 8:
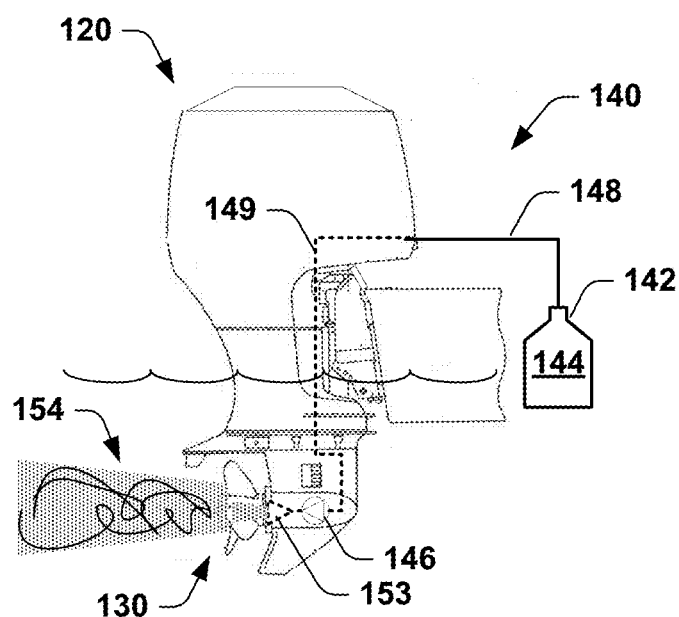

In the embodiment shown in FIG. 7, the pump 146 of the enhancement system 140 is disposed within the housing 124 of the marine propulsion system 120. Similarly, in the embodiment shown in FIG. 8, the pump 146 of the enhancement system 140 is disposed within a lower portion of the housing 124 proximate the propeller assembly 130. In these embodiments, the pump 146 may be electrically or mechanically driven by the engine 122 or the drive train 132 (FIG. 2), or even by the battery 152 (FIG. 2) as described above, to transport the enhancement substance 144 through the feed lines 148, 149 to the dispensing portion 153 to produce the enhancement plume 154.

Figure 9:
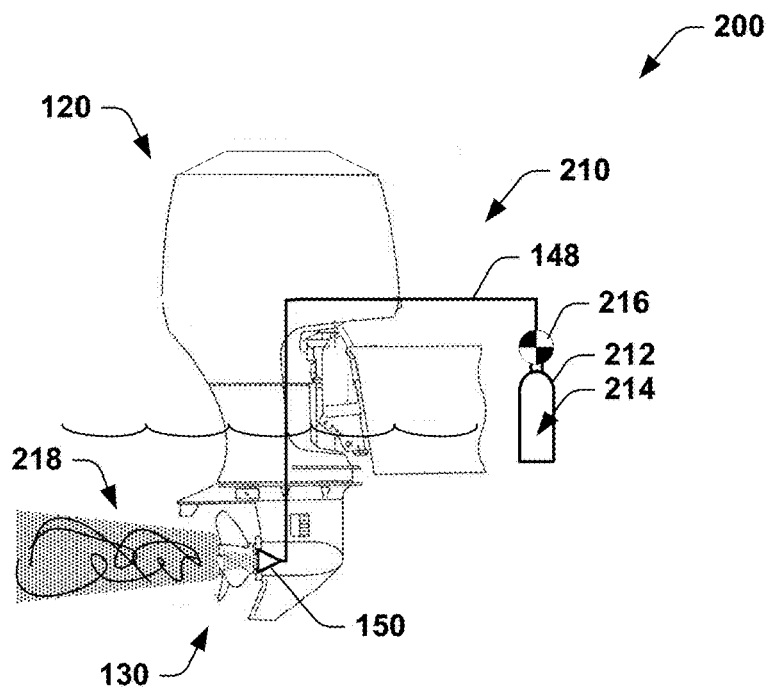

Depending upon the type of substances being dispensed by the enhancement system, the enhancement system may have a variety of different embodiments from those described above. For example, FIG. 9 is a partial side view of a watercraft 200 having a marine environment enhancement system 210 configured for dispensing pressurized substances in accordance with another embodiment of the present disclosure. In this embodiment, the enhancement system 210 includes a vessel 212 configured to contain a pressurized enhancement substance 214. A valve 216 is configured to controllably dispense the substance 214 through the feed line 148 to the dispensing portion 150. For example, in some embodiments, the vessel 212 may be a gas bottle and the enhancing substance may be a pressurized gas, such as ozone, monatomic or diatomic oxygen, air, an oxygen-containing compound, or any other desired gaseous substance.

As the marine propulsion system 120 is operated, the enhancement system 210 may dispense the pressurized enhancement substance 214 by opening the valve 216. In some embodiments, the control of the valve 216 may be linked to the control of the marine propulsion system 120, such as by slaving valve control to throttle position, engine RPM, engine vacuum, or any other suitable parameter. Alternately, the control of the valve 216 may be purely manual, or may depend on other factors or variables.

Figure 10:
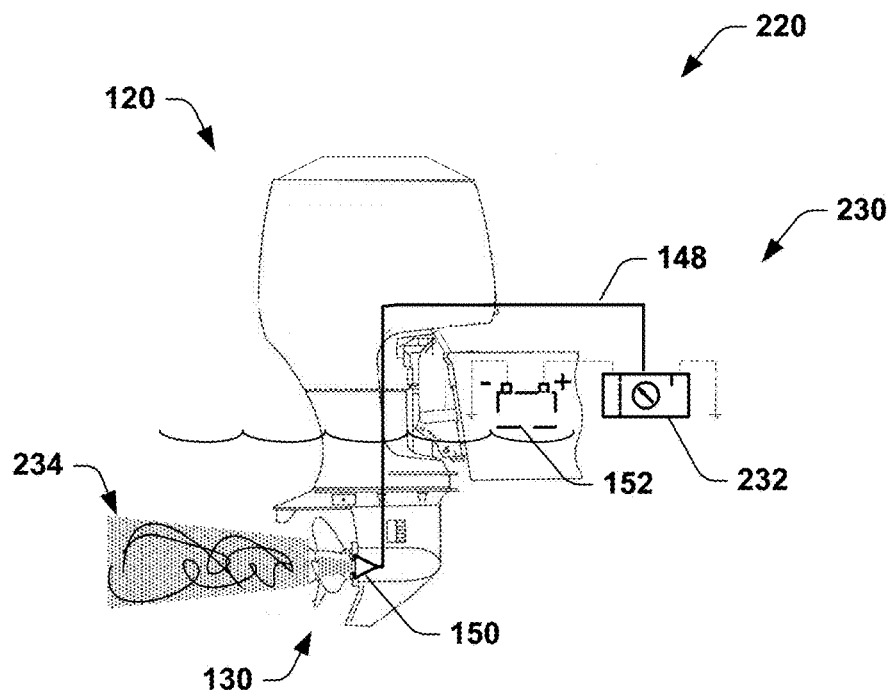

In another embodiment, the enhancement system may be configured to generate the enhancement substance during operation (or "on the fly"). For example, FIG. 10 is a partial side view of a watercraft 220 having a marine environment enhancement system 230 configured to generate and dispense enhancement substances in accordance with another embodiment of the present disclosure. In this embodiment, the enhancement system 230 includes a gas generator 232 configured to generate a gaseous enhancement substance. The feed line 148 is coupled to the gas generator 232, and conveys the gaseous substance generated by the gas generator 232 to the dispensing portion 150. The gas generator 232 may be powered by the battery 152, or may be electrically or mechanically powered by the engine 122 of the marine propulsion system 120, or may be powered or driven in any other suitable manner.

In particular embodiments, the gas generator 232 may be an ozone generator. Ozone is generally known for its electrochemical reactivity characteristics, and may be used in some circumstances to enhance water quality, and thus the overall ecological health of a marine environment. For example, in some embodiments, the gas generator 232 may be an electro-analysis ozone generator, including, for example, a chemical electrolysis-based ozone generator, or a polymer electrolysis (or membrane-based) ozone generator. Alternately, the ozone generator may be an air discharge or ultraviolet light (UV) radiation-based generator.

In still other embodiments, any other type of gas generation device that generates any desired gaseous substance (including substances other than ozone) may be used. For example, in some embodiments, it may be desirable to generate and dispense monatomic or diatomic oxygen, air, an oxygen-containing compound, or any other desired gaseous substance. Such gas generation devices may operate on principles similar to those listed above with respect to ozone generation processes, including electro-analysis processes, chemical electrolysis-based processes, polymer electrolysis (or membrane-based) processes, air discharge processes, or UV radiation-based processes. In addition, the gaseous enhancement substances may include electrically-charged substances (e.g. ions, electrons, etc.) or electrically-neutral substances.

While not intending to be bound by theory, it is believed that those embodiments in accordance with the present disclosure having the dispensing portion 150 proximate the propeller assembly 130 may allow more of the enhancement substance 214 (particularly gaseous enhancement substances) to be assimilated into the marine environment 110 in comparison with alternate methods wherein the enhancement substance may merely bubble to the surface 111 and escape, or sink to the bottom, without being as effectively distributed into the marine environment 110. More specifically, it is believed that the enhancement plume may become more readily mixed and assimilated into the marine environment 110 due at least in part to the rotation of the propeller assembly 130, or through interaction with the propulsive stream (e.g. drive stream 134) from the marine propulsion system. In this way, embodiments of enhancement systems in accordance with the present disclosure may provide improved mixing and improved solubility of the enhancement substance 214 into the marine environment 110 that would otherwise not occur. Thus, substances that may be vitally important to the health of the marine environment 110, including gaseous substances such as oxygen and oxygen-enhancing substances, may be readily assimilated into the marine environment 110.

Figure 11:
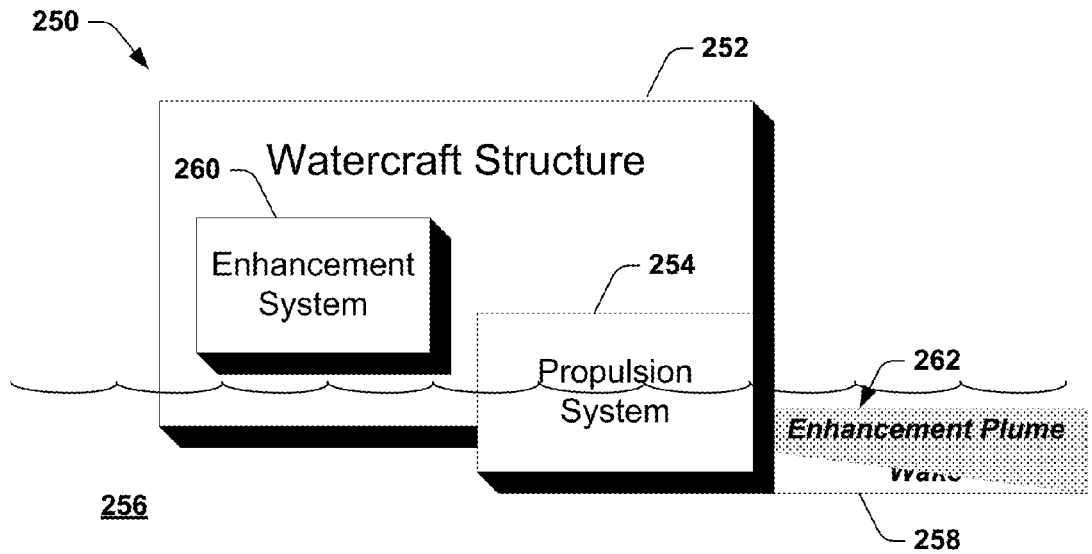
FIG. 11 is a block diagram of a watercraft having a marine environment enhancement system in accordance with another embodiment of the present disclosure.

FIG. 11 is a block diagrammatic view of a watercraft 250 having a marine environment enhancement system 270 in accordance with another embodiment of the present disclosure. In this embodiment, the watercraft 250 includes a structure 252 that may be floatable, submersible, or both. A propulsion system 254 is operatively coupled to the structure 252 to propel the watercraft 250 through a marine environment 256. During operation of the watercraft 250, the watercraft 250 generates a wake 258. The wake 258 may include a propulsive portion (e.g. drive stream 134 of FIG. 1) generated by the propulsion system 254, and a non-propulsive portion generated by other portions of the watercraft 250, such as the structure 252. Unless otherwise specified, the term "wake" as used herein may generally include any portion of the marine environment 256 disturbed by the operation of the watercraft 250, including phenomena occurring at the surface of the marine environment 256 and below the surface of the marine environment 256.

The watercraft 250 further includes an enhancement system 260. During operation, the enhancement system 260 dispenses an enhancement plume 262 into the marine environment 256. At least a portion of the enhancement plume 262 mingles with the wake 258. More specifically, in some embodiments, at least a portion of the enhancement plume 262 mingles with the propulsive portion of the wake 258 (e.g. drive stream 134 of FIG. 1). The enhancement plume 262 may include a substance (e.g. mixture, compound, molecule, etc.) in any suitable phase (e.g. liquid, gas, solid, or multi-phase combinations thereof) or that is configured to enhance some aspect of the marine environment 256. The enhancement substance may also include charged substances, particles, or molecules.

Figure 12:
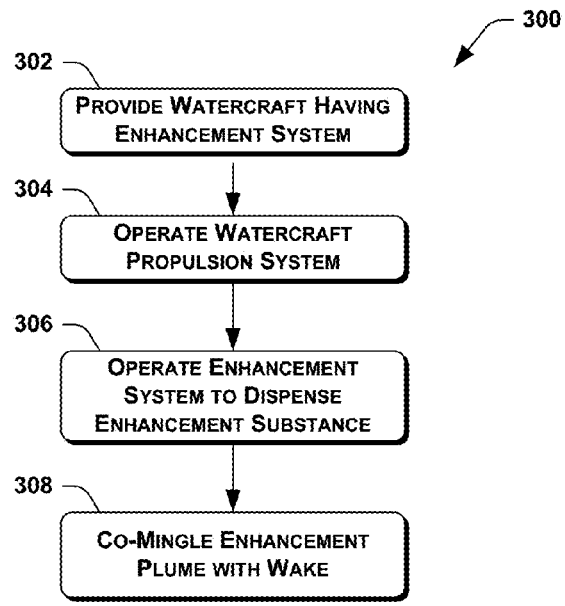
FIG. 12 is a flow chart of a process for operating a watercraft in accordance with another embodiment of the present disclosure.

FIG. 12 is a flow chart of a process 300 for operating a watercraft in accordance with another implementation of the present disclosure. The process 300 is illustrated as a collection of blocks in a logical flow graph, which represents a sequence of operations that can be implemented manually, semi-manually, automatically, or any combination thereof using hardware, software, firmware, or other suitable components.

In this embodiment, the process 300 includes providing a watercraft having a marine environment enhancement system at 302. A propulsion system of the watercraft is operated at 304 to propel the watercraft through a marine environment, thereby generating a wake. At 306, a marine environment enhancement system is operated to dispense an enhancement substance into the marine environment. The dispensing of the enhancement substance at 306 may generally occur simultaneously with the operation of the watercraft propulsion system at 304. As described above, the enhancement substance may be any suitable substance (e.g. mixture, compound, molecule, etc.) in any suitable phase (e.g. liquid, gas, solid, or combinations thereof) that is configured to enhance some aspect of the marine environment. In particular embodiments, the enhancement substance may be configured to supplement a component of the marine environment that may be lacking (e.g. oxygen, food, nutrients, etc.), correct pollution or contaminants, control or deter the presence of undesirable marine species, or other suitable enhancement purposes.

At 308, the dispensed enhancement substance (e.g. enhancement plume) may be co-mingled with the wake of the watercraft propulsion system thereby providing improved mixing and assimilation of the enhancement substance into the marine environment. In some embodiments, the enhancement substance co-mingles with a portion of the wake generated by the propulsion system of the watercraft, such as a propulsive stream or drive stream. In particular embodiments, the enhancement substance is dispensed below a surface of the marine environment and co-mingles with a portion of the wake existing below the surface of the marine environment.

The process 300 shown in FIG. 12 is one of many possible implementations of processes in accordance with the teachings of the present disclosure. For example, in alternate implementations, certain acts need not be performed in the order described, and may be modified, and/or may be omitted entirely, depending on the circumstances. Moreover, in various implementations, the acts described may be implemented manually, semi-manually, automatically, or any suitable combination thereof.

Figure 13:
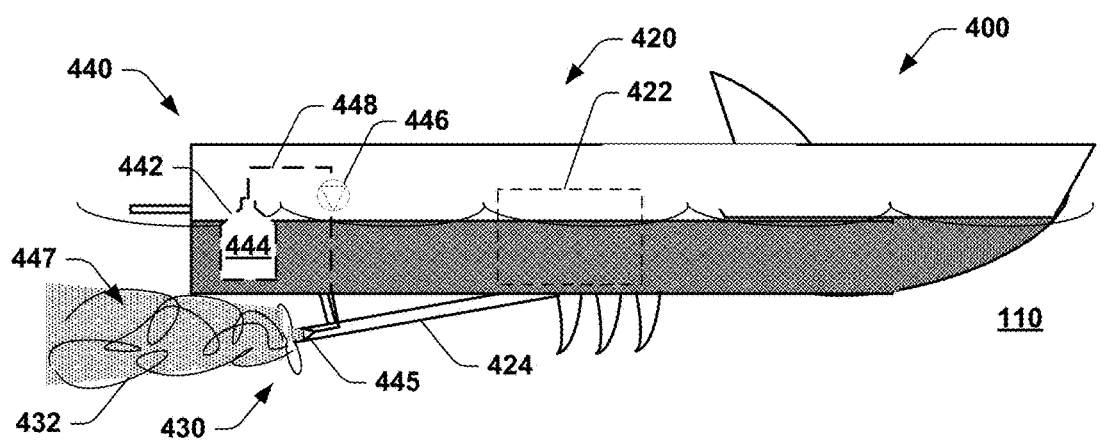
FIGS. 13-17 are side views of various alternate embodiments of watercraft and marine propulsion systems having marine environment enhancement capabilities in accordance with further embodiments of the present disclosure.
Figure 14:
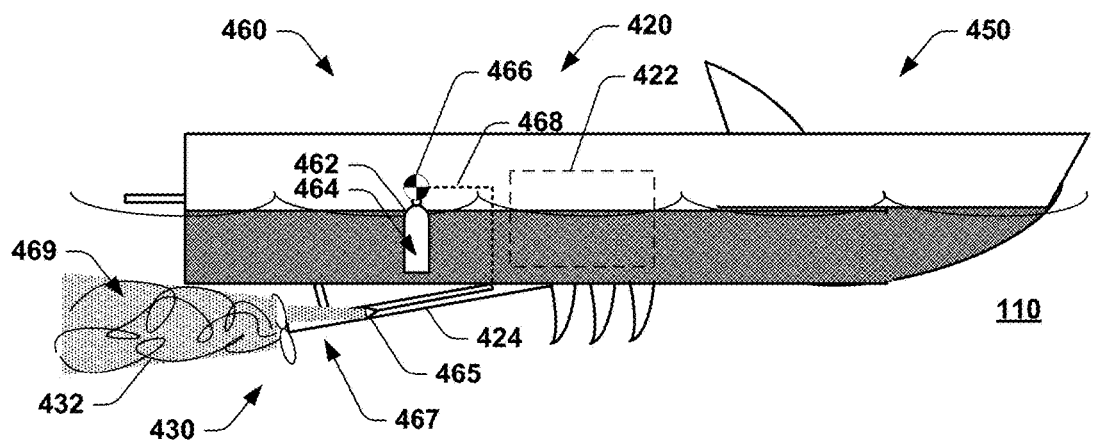

The previously-described embodiments have been described with respect to a marine propulsion system having an outboard engine. Systems and methods in accordance with the present disclosure may also be implemented with watercraft having other types of propulsion systems. For example, FIG. 13 is a side view of a watercraft 400 having a marine propulsion system 420 and a marine environment enhancement system 440 in accordance with another embodiment of the present disclosure. In this embodiment, the marine propulsion system 420 includes an engine 422 and a drive assembly 424 that projects downwardly and rearwardly from a hull 402 of the watercraft 400. A propeller assembly 430 is coupled to an aft end of the drive assembly 424. The marine propulsion system 420 of FIG. 13 is of a type commonly referred to as an "inboard" or "inboard engine" type system.

In the embodiment shown in FIG. 13, the marine environment enhancement system 440 includes a supply vessel 442 and a pump 446 that drives an enhancement substance 444 through a feed line 448 from the supply vessel 442 to a dispensing portion 445. The dispensing portion 445 may be positioned slightly upstream from the propeller assembly 430, or as described elsewhere in this disclosure, may be positioned at any other suitable position.

In operation, the engine 422 causes the drive assembly 424 to rotate the propeller assembly 430, producing a drive stream 432 that propels the watercraft 400 forward through the marine environment 110. As the marine propulsion system 420 operates, the pump 446 transports the enhancement substance 444 from the supply vessel 442 through the feed line 448 and out the dispensing portion 445. A plume 447 of the enhancement substance 444 is dispensed from the dispensing portion 445 and co-mingles with the drive stream 432 produced by the propeller assembly 430.

It will be appreciated that alternate implementations of marine environmental enhancement systems may be combined with the marine propulsion system 420 to provide further embodiments of systems and methods in accordance with the present disclosure. For example, in FIG. 14, a watercraft 450 includes an enhancement system 460 that includes a pressurizable vessel 462 and a valve 466 configured to controllably dispense an enhancement substance 464 through a feed line 468 to a dispensing portion 465. In this implementation, the dispensing portion 465 is located appreciably upstream from the propeller assembly 430.

During operation, as the marine propulsion system 420 is operated to generate the drive stream 432, the marine environment enhancement system 460 dispenses the enhancement substance 464 by opening the valve 466. Due to the location of the dispensing portion 465, an enhancement plume first portion 467 forms downstream of the dispensing portion 465 and upstream of the drive stream 432. Once the enhancement plume first portion 467 reaches the drive stream 432, it co-mingles with the drive stream 432 to form an enhancement plume second portion 469.

Figure 15:
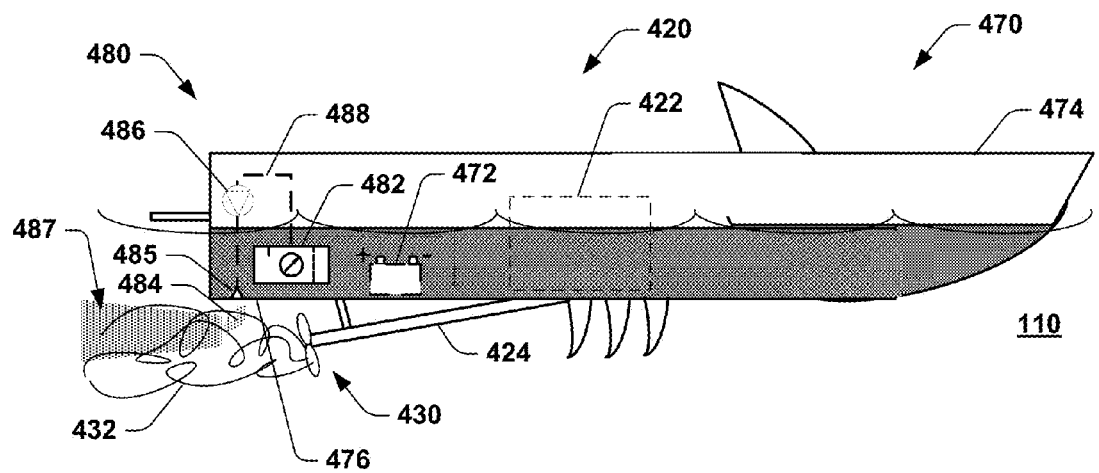

In yet another implementation, FIG. 15 shows a watercraft 470 having a marine environment enhancement system 480 configured to generate an enhancement substance 484 during operation of the enhancement system 480 (i.e. "on the fly"). In this embodiment, the enhancement system 480 includes a gas generator 482 configured to generate a gaseous enhancement substance 484. The gas generator 482 may be powered by a battery 472, or may be electrically or mechanically powered by the engine 422 of the marine propulsion system 420. A pump 486 transports the enhancement substance 484 via a feed line 488 to a dispenser 485. In the embodiment shown in FIG. 15, the dispenser 485 is mounted (e.g. flush mounted or otherwise) to a lower surface 476 of a hull (or structure) 474 of the watercraft 470. As the enhancement substance 484 is dispensed into the marine environment 110 by the enhancement system 480, and as the marine propulsion system 420 is operating, the enhancement substance 484 may become co-mingled with the drive stream 432 generated by the propeller assembly 430 to form an enhancement plume 487.

Although systems and methods for watercraft and marine propulsion systems having marine environment enhancement capabilities have been described with reference to a particular type of watercraft, it will be appreciated that in alternate implementations, a wide variety of watercraft types may be suitably equipped with marine environment enhancement systems. Representative examples of other types of watercraft that may be employed in various alternate implementations in accordance with the present disclosure include ships and other large-scale surface vessels such as auto and passenger ferries, military vessels, container ships, oil tankers, barges, tugs, ocean liners, and any other suitable commercial or large-scale surface vessels, and also other forms of small-scale surface vessels such as personal watercraft, jetskis, pontoons, recreational boats, inflatable boats. Furthermore, alternate implementations in accordance with the present disclosure may include submersible watercraft such as submarines, remotely-operated vehicles (ROVs), and other manned and unmanned submersible vehicles. It will also be appreciated that other implementations of systems and methods may be conceived using still other embodiments of marine propulsion systems.

Figure 16:
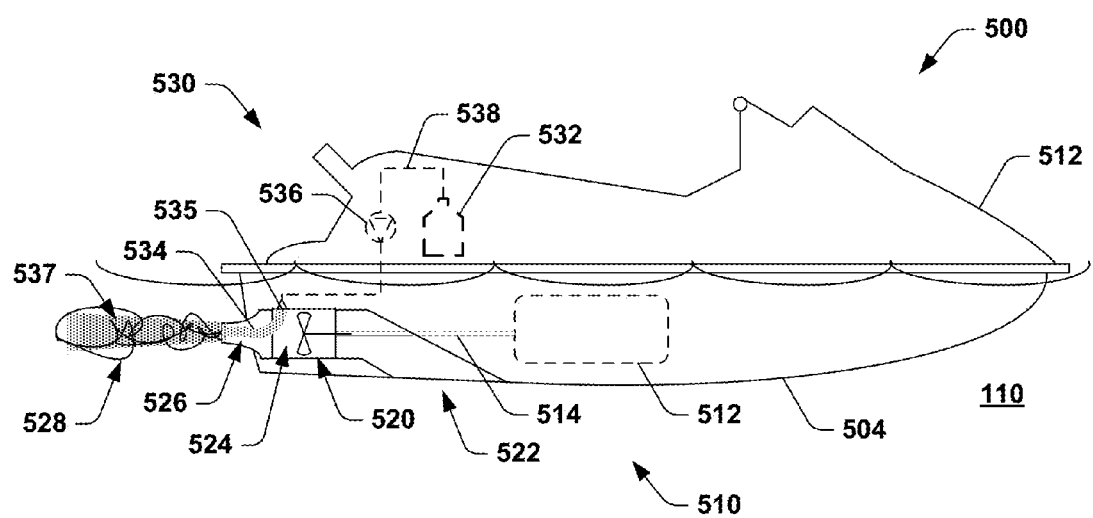
Figure 17:
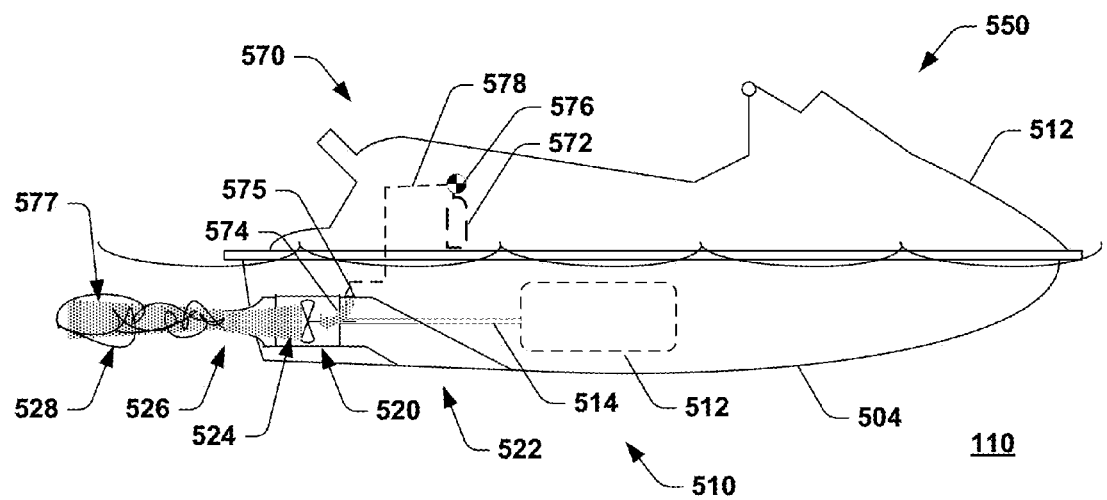

For example, FIG. 16 is a side view of a watercraft 500 having a marine propulsion system 510 and a marine environment enhancement system 530 in accordance with another embodiment of the present disclosure. In this implementation, the watercraft 500 is of a type generally known as a personal watercraft (or wave runner). The marine propulsion system 510 includes an engine 512 and a drive assembly 514 coupled between the engine 512 and a propeller assembly 520. An intake 522 is formed within a lower surface 504 of a hull (or structure) 502 of the watercraft 500. During operation of the marine propulsion system 510, water passes through the intake 522 to a drive chamber 524, and is propelled by the propeller assembly 520 through an exit aperture (or nozzle) 526 to form a drive stream 528 that propels the watercraft 500. The marine propulsion system 510 is of a type commonly referred to as a "jet drive" type system.

The marine environment enhancement system 530 includes a supply vessel 532 and a pump 536 that drives an enhancement substance 534 through a feed line 538 to a dispensing portion 535. In the implementation shown in FIG. 16, the dispensing portion 535 is located within a wall of the drive chamber 524 slightly downstream from the propeller assembly 520. As the marine propulsion system 530 operates, the pump 536 transports the enhancement substance 534 from the supply vessel 532 through the feed line 538 and out the dispensing portion 535 into the drive chamber 524. The enhancement substance 534 co-mingles with the water driven by the propeller assembly 520 and exits from the exit aperture 526 to form an enhancement plume 537 that may be assimilated into the marine environment 110.

Figure 18:
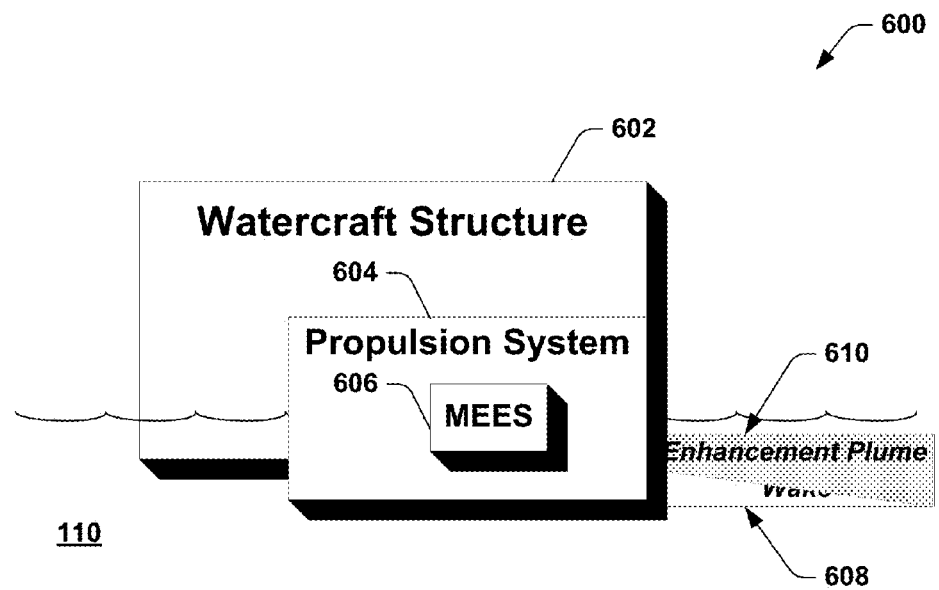
FIG. 18 is a block diagram of a watercraft having a marine environment enhancement system integrated with a marine propulsion system in accordance with yet another embodiment of the present disclosure.

In some embodiments, the marine environment enhancement system may be partially or wholly integrated into the marine propulsion system. For example, FIG. 18 shows a block diagram of a watercraft 600 having a marine environment enhancement system (MEES) 606 integrated with a marine propulsion system 604 in accordance with yet another embodiment of the present disclosure. In operation, the propulsion system 604 generates a wake 608 that propels the watercraft 600 through the marine environment 110, and the marine environment enhancement system 606 provides an enhancement substance plume 610 into the marine environment 110. The enhancement substance plume 610 and the wake 608 may co-mingle to better assimilate the enhancement substance into the marine environment 110. In some embodiments, the enhancement substance co-mingles with a portion of the wake generated by the propulsion system of the watercraft, such as a propulsive stream or drive stream. In particular embodiments, the enhancement substance is dispensed below a surface of the marine environment and co-mingles with a portion of the wake existing below the surface of the marine environment.

Figure 19:
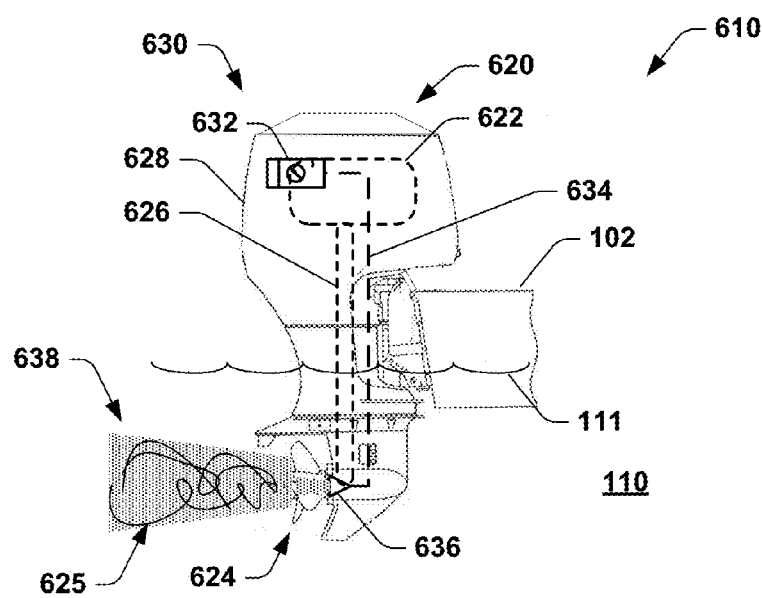
FIGS. 19-21 are side views of various alternate embodiments of watercraft and marine propulsion systems having marine environment enhancement capabilities integrated with marine propulsion systems in accordance with embodiments of the present disclosure.
Figure 20:
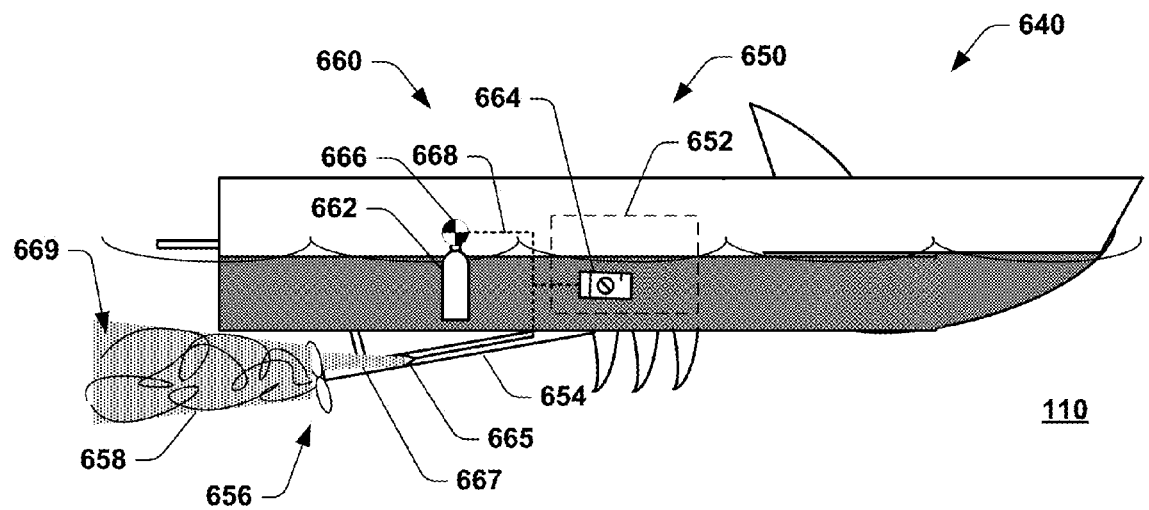
Figure 21:
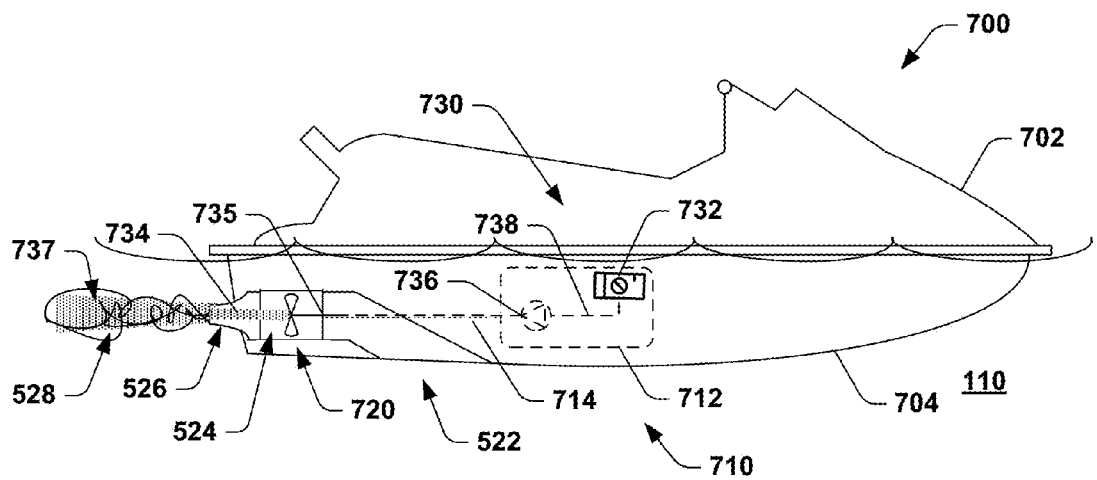

Several exemplary implementations of watercraft and marine propulsion systems having an integrated enhancement system are shown in FIGS. 19-21. For example, in the implementation shown in FIG. 19, a marine propulsion system 620 in the configuration of an outboard engine is coupled to a structure 102 (see FIG. 1) of a watercraft 620. The propulsion system 620 includes an engine 622 disposed within a housing 628 and operatively coupled to a propeller assembly 624 by a drive assembly 626. The marine propulsion system 620 includes a marine environment enhancement system 630 having an enhancement substance generator 632. A feed line 634 is coupled between the enhancement substance generator 632 and a dispenser 636 located below a surface 111 of the marine environment 110. In some embodiments, the enhancement substance generator 632 may be configured to generate a gaseous substance or compound such as, for example, ozone, monatomic or diatomic oxygen, or any other desired gaseous substance. In further embodiments, the generator 632 may be configured to emit charged particles or molecules.

During operation of the marine propulsion system 620, the engine 622 drives the propeller assembly 624 to generate a propulsion wake 625 to propel the watercraft 610 through the marine environment 110. The enhancement substance generator 632 simultaneously generates the enhancement substance, which is then dispensed into the marine environment 110 (e.g. via the feed line 634 and dispenser 636) to form an enhancement plume 638.

It will be appreciated that in some embodiments, the feed line 634 and the dispenser 636 may be eliminated, and the enhancement substance generator 632 may be configured to provide the enhancement substance into an exhaust stream from the engine 622. Since the marine propulsion system 620 may already be configured to direct the engine exhaust stream into the marine environment 110, the enhancement substance generated by the generator 632 may be carried or delivered into the marine environment 110 without the need for additional components or further significant modification of the marine propulsion system 620. Such an implementation may be particularly advantageous for those environmental enhancement systems that are intended or configured to mitigate some harmful or undesirable attribute of the exhaust stream being emitted into the marine environment 110 by the engine 622.

FIG. 20 is a side view of a watercraft 640 having a marine propulsion system 650 in accordance with yet another embodiment of the present disclosure. In this embodiment, the marine propulsion system 650 includes an engine 652 operatively coupled to a propeller assembly 656 by a drive assembly 654. A marine environment enhancement system 660 includes a vessel 662 that stores a first enhancement substance, and a generation unit 664 that generates a second enhancement substance. The generation unit 664 is integrally-formed with the marine propulsion system 650 (e.g. coupled with the engine 652). Thus, in this embodiment, the marine environment enhancement system 660 is partially integrally formed with the marine propulsion system 650.

A flow control device 666 (e.g. a valve) controls a flow of the first enhancement substance from the vessel 662 through a feed line 668 to a dispenser 665. upstream from the propeller assembly 430. The second enhancement substance may flow from the generation unit 664 through the feed line 668 to the dispenser 665. In this implementation, the dispenser 665 is positioned appreciably upstream from the propeller assembly 656.

During operation, the marine propulsion system 650 spins the propeller assembly 656 and thus generates a drive stream 658. Simultaneously, the environment enhancement system 660 operates to provide the first and second enhancement substances to the feed line 668, and ultimately to the dispenser 665. Due to the location of the dispenser 665, the mixture of first and second enhancement substances forms a first plume portion 667 between the dispensing portion 665 and the propeller assembly 656 (or drive stream 658). Once the first plume portion 667 reaches the drive stream 658, it co-mingles with the drive stream 658 to form a second plume portion 669.

Similarly, FIG. 21 is a side view of a watercraft 700 having a marine environment enhancement system 730 at least partially integrated with a marine propulsion system 710. More specifically, in this implementation, the marine propulsion system 710 includes an engine 712, and the marine environment enhancement system 730 includes an enhancement substance generator 732 integrated with (or coupled to) the engine 712. A drive assembly 714 is coupled between the engine 712 and a propeller assembly 720. The marine environment enhancement system 730 further includes a pump 736 that provides an enhancement substance 734 from the substance generator 732 through a feed line 738 to a dispensing portion 735. In some implementations, at least part of the feed line 738 is integrally formed with the drive assembly 714 (e.g. a drive shaft).

During operation of the marine propulsion system 710, water enters an intake 522 formed within a lower surface 704 of a hull 702 of the watercraft 700. The engine 712 drives the propeller assembly 720 via the drive assembly 714, spinning the propeller assembly 720 within the mixing chamber 524 and driving water through an exit aperture 526 to form a drive wake 528 that propels the watercraft 700. The generator 732 generates the enhancement substance 734 which traverses the feed line 738 and out the dispensing portion 735 into the drive chamber 524. More specifically, in an exemplary implementation, the enhancement substance 734 passes through a hollow drive shaft of the drive assembly 714 to the dispenser 735. The enhancement substance 734 co-mingles with the water driven by the propeller assembly 720 and exits from the exit aperture 526 to form an enhancement plume 737 that is assimilated into the marine environment 110.

Figure 22:
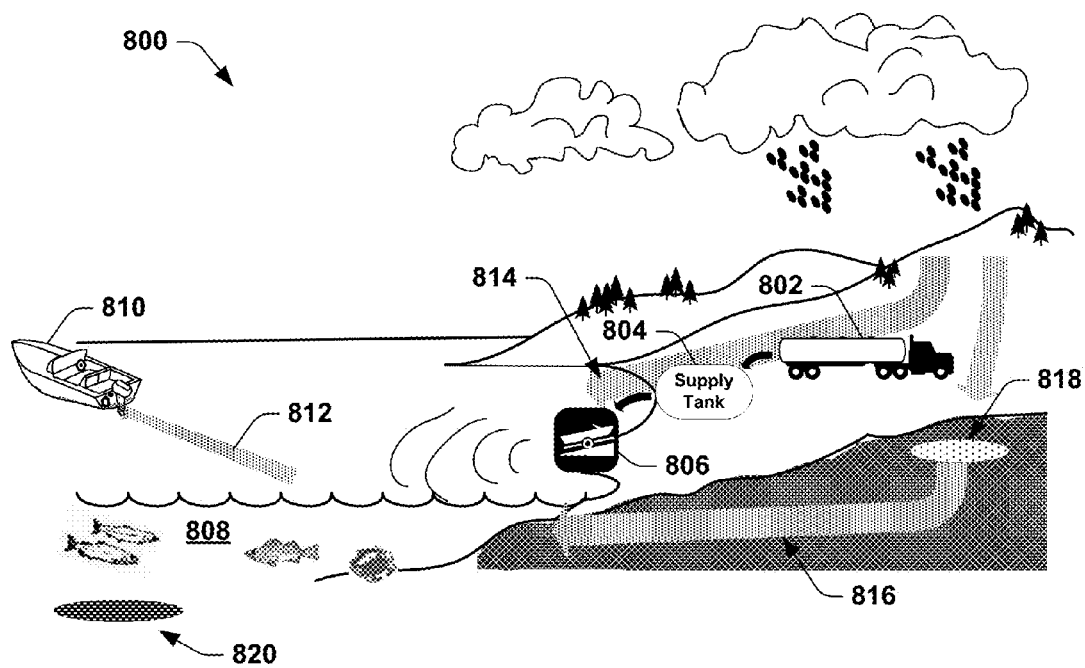
FIG. 22 is a schematic view of a system of dispensing marine environment enhancing substances in accordance with a further embodiment of the present disclosure.
Figure 23:
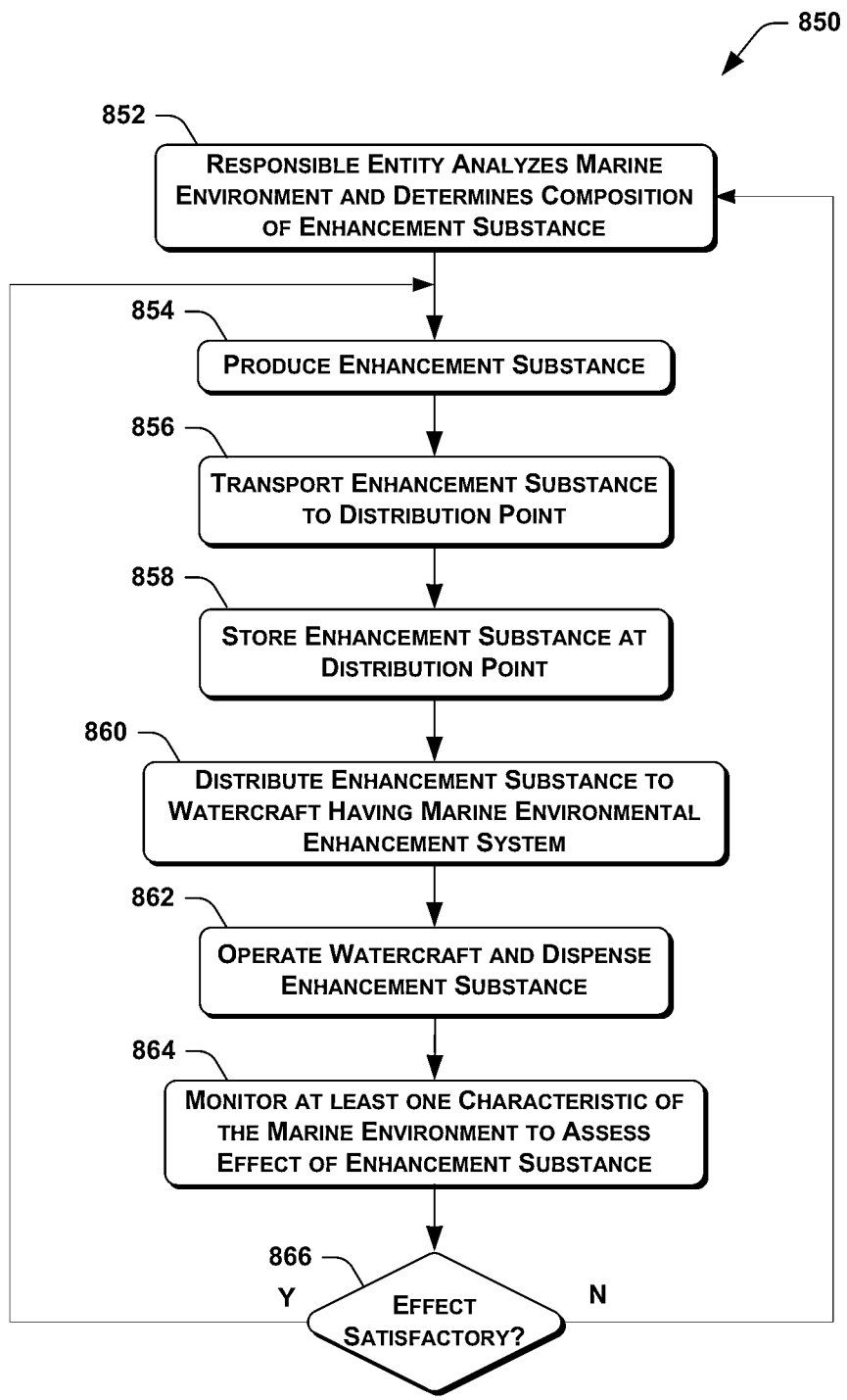
FIG. 23 is a flow chart of a process for dispensing marine environment enhancing substances in accordance with another embodiment of the present disclosure.

FIG. 22 is a schematic view of a system 800 for dispensing marine environment enhancing substances, and FIG. 23 is a process 850 for dispensing marine environment enhancing substances, in accordance with further embodiments of the present disclosure. The system 800 includes a supply vehicle 802 that transports an enhancement substance to a supply tank 804 situated proximate to a boat launch 806 that provides access to a marine environment 808. A watercraft 810 having a marine environment enhancement system operates within the marine environment 808.

As shown in FIG. 23, at 852, an organization, governmental authority, or other suitable entity responsible for managing the marine environment 808 or portions thereof (such as a department responsible for managing fish and wildlife, or a department responsible for managing water quality) may analyze the marine environment and determine a desired composition of the enhancement substance. As noted above, the enhancement substance may be any suitable mixture, substance, compound, or material that is configured to enhance some aspect of the marine environment 808.

For example, in some embodiments, the enhancement substance may be configured to mitigate pollutants that may arrive into the marine environment 808 from surface water runoff 814, from ground water 816 leaching contaminants from land-based materials 818 (e.g. dumps, buried wastes, septic tanks, etc.), or from other possible sources, such as an output of a marine propulsion system of the watercraft 810, or a detrimental material 820 previously deposited within the marine environment 808. Therefore, the desired composition of the enhancement substance may represent a careful balancing of requirements.

The enhancement substance may be produced at 854. In some embodiments, the enhancement substance may be produced in large quantities at a location that is distally located from the marine environment 808. Alternately, the enhancement substance may be produced near the marine environment 808, or as described above, may even be produced "on the fly" during operation of the watercraft 810.

At 856, assuming the enhancement substance has been produced at a distal location, the enhancement substance may be transported to a suitable distribution point. For example, as shown in FIG. 23, the enhancement substance may be transported by a tanker truck 802 to a distribution point located proximate a boat launch 806. Alternately, the distribution point may be any other suitable location (e.g. park entrance, gasoline station, marine supply center, shipping pier, ferry terminal, naval base, refueling center, etc.). The enhancement substance is stored (e.g. within the supply tank 804) at the distribution point at 858.

The enhancement substance may be distributed to the watercraft 810 at 860. For example, in the embodiment shown in FIG. 22, the watercraft 810 may take on the enhancement substance from the supply tank 804 at the boat launch 806. At 862, the watercraft 810 may then be operated within the marine environment 808 while simultaneously dispensing the enhancement substance as an enhancement plume 812 into the marine environment 808.

As further shown in FIG. 23, during or after the enhancement substances are dispensed into the marine environment (at 862), one or more characteristics of the marine environment may be monitored (or tested) to assess the effects of the enhancement substance on the marine environment at 864. For example, the organization, governmental authority, or other suitable entity responsible for managing the marine environment 808 (or portions thereof) may periodically (or continuously) collect samples, perform measurements, tests, or surveys, or conduct any other suitable activities intended to evaluate the impact or effectiveness of the enhancement substance on the marine environment.

Based on the results of the monitoring (at 864), a determination is made at 866 whether the enhancement substance is satisfactorily effective. If so, then the process 850 may return to 854, and may continue producing the enhancement substance without adjusting the composition, and may repeat the activities 854 through 866 without adjusting the composition of the enhancement substance. Alternately, if it is determined that the enhancement substance has not been satisfactorily effective (at 866), then the process 850 may return to 852 so that the organization, governmental authority, or other suitable entity responsible for managing the marine environment 808 (or portions thereof) may re-analyze the marine environment and re-determine the composition of the enhancement substance. The process 850 may then repeat the activities 854 through 866 with the enhancement substance having an adjusted composition.

Embodiments of systems and methods for watercraft and marine propulsion systems in accordance with the present disclosure may advantageously dispense ecologically-appropriate substances into a marine environment during operation. Such enhancement substances may be configured to enhance the marine environment in a variety of ways, such as providing food, nutrients, oxygen, or other healthful substances, to mitigate wastes, pollutants, human pathogens, chemical or PH balances within the marine environment, or to perform any other suitable enhancements. Thus, rather than merely attempting to reduce negative ecological impacts, embodiments of watercraft and marine propulsion systems in accordance with the present disclosure are advantageously configured with a capability to attempt to improve some aspect of the marine environment in which they operate.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method, comprising:
   providing a watercraft having an enhancement system configured to dispense an enhancement substance into a marine environment, the enhancement substance being configured to mitigate an invasive species present in the marine environment, the watercraft having a propulsion system that includes a propeller;
   generating a wake in the marine environment using the propulsion system of the watercraft including rotating the propeller while the propeller is positioned at least partially below the surface of the marine environment to propel the watercraft across a surface of the marine environment; and
   simultaneously with generating the wake as the propulsion system is operated to propel the watercraft across the surface of the marine environment, dispensing the enhancement substance from at least one dispensing location below the surface of the marine environment proximate the rotating propeller using the enhancement system so that the enhancement substance interacts with at least a portion of the marine environment propelled by the rotating propeller to at least partially mingle the enhancement substance with the marine environment, wherein the dispensing of the enhancement substance is operably linked to a control of the propulsion system such that engagement of the propulsion system to propel the watercraft causes the enhancement system to dispense the enhancement substance and disengagement of the propulsion system causes the enhancement system to discontinue dispensing of the enhancement substance.

2. The method of claim 1, wherein:
   generating a wake includes generating a wake having a propulsive portion generated by the rotating propeller interacting with a portion of the marine environment; and
   dispensing an enhancement substance includes dispensing the enhancement system so that the enhancement substance at least partially mingles with the propulsive portion of the wake.

3. The method of claim 1, wherein dispensing the enhancement substance includes dispensing the enhancement substance into the marine environment at a location disposed below a surface of the marine environment.

4. The method of claim 1, wherein dispensing the enhancement substance using the enhancement system includes pumping the enhancement substance from a supply vessel.

5. The method of claim 1, wherein dispensing the enhancement substance using the enhancement system includes releasing the enhancement substance from a pressurized supply vessel.

6. The method of claim 1, wherein dispensing the enhancement substance includes dispensing at least one of air, ozone, monatomic oxygen, diatomic oxygen, an oxygen-containing substance, and an oxygen enhancing substance.

7. The method of claim 1, wherein dispensing the enhancement substance using the enhancement system includes generating the enhancement substance.

8. The method of claim 7, wherein generating the enhancement substance includes generating ozone.

9. The method of claim 8, wherein generating ozone includes generating ozone using at least one of an electroanalysis ozone generation process, a chemical electrolysis-based ozone generation process, a polymer electrolysis ozone generation process, a membrane-based ozone generation process, an air discharge ozone generation process, and an ultraviolet light radiation-based ozone generation process.

10. The method of claim 1, wherein dispensing the enhancement substance includes dispensing an enhancement substance configured to promote one or more marine species.

11. The method of claim 1, wherein the enhancement substance being configured to mitigate an invasive species present in the marine environment includes an enhancement substance being configured to mitigate a pathogen present in the marine environment.

12. The method of claim 1, wherein dispensing the enhancement substance includes dispensing an enhancement substance configured to mitigate one or more pollutants.

13. The method of claim 1, wherein the propeller is driven by an engine.

14. The method of claim 13, wherein dispensing the enhancement substance includes dispensing the enhancement substance in an exhaust flow from the engine proximate the propeller.

15. The method of claim 1, wherein dispensing the enhancement substance from at least one dispensing location below the surface of the marine environment proximate the rotating propeller using the enhancement system so that the enhancement substance interacts with at least a portion of the marine environment propelled by the rotating propeller includes dispensing the enhancement substance proximate to and upstream of the rotating propeller using the enhancement system so that the enhancement substance interacts with at least a portion of the marine environment propelled by the rotating propeller.

16. The method of claim 1, wherein dispensing the enhancement substance from at least one dispensing location below the surface of the marine environment proximate the rotating propeller using the enhancement system so that the enhancement substance interacts with at least a portion of the marine environment propelled by the rotating propeller includes dispensing the enhancement substance proximate to and downstream of the rotating propeller using the enhancement system so that the enhancement substance interacts with at least a portion of the marine environment propelled by the rotating propeller.

17. The method of claim 1, wherein the watercraft includes a hull and the propeller is disposed external to the hull.

18. The method of claim 1, wherein the watercraft includes a hull and the propeller is disposed within a chamber disposed within the hull.

19. A method, comprising:
generating a wake in a marine environment using a propulsion system of a watercraft including rotating a propeller of the propulsion system while the propeller is positioned at least partially below the surface of the marine environment to propel the watercraft across a surface of the marine environment, the watercraft having an enhancement system configured to dispense an enhancement substance, the enhancement substance being configured to mitigate an invasive species present in the marine environment; and
simultaneously with generating the wake as the propulsion system is operated to propel the watercraft across the surface of the marine environment, dispensing the enhancement substance from at least one dispensing location below the surface of the marine environment proximate the rotating propeller such that the enhancement substance interacts with at least a portion of the marine environment propelled by the rotating propeller to at least partially mingle the enhancement substance with the marine environment, wherein the dispensing of the enhancement substance is operably linked to a control of the propulsion system such that engagement of the propulsion system to propel the watercraft causes the enhancement system to dispense the enhancement substance and disengagement of the propulsion system causes the enhancement system to discontinue dispensing of the enhancement substance.

20. A method, comprising:
providing a watercraft having an enhancement system configured to dispense an enhancement substance into a marine environment, the enhancement substance including at least one molecular compound configured to mitigate a pathogen present in the marine environment, the watercraft having a propulsion system that includes a propeller;
generating a wake in the marine environment using the propulsion system of the watercraft including rotating the propeller while the propeller is positioned at least partially below the surface of the marine environment to propel the watercraft across a surface of the marine environment; and
simultaneously with generating the wake as the propulsion system is operated to propel the watercraft across the surface of the marine environment, dispensing the enhancement substance from at least one dispensing location below the surface of the marine environment proximate the rotating propeller using the enhancement system so that the enhancement substance interacts with at least a portion of the marine environment propelled by the rotating propeller to at least partially mingle the enhancement substance with the marine environment, wherein the dispensing of the enhancement substance is operably linked to a control of the propulsion system such that engagement of the propulsion system to propel the watercraft causes the enhancement system to dispense the enhancement substance and disengagement of the propulsion system causes the enhancement system to discontinue dispensing of the enhancement substance.

* * * * *